United States Patent
Agrawal et al.

(10) Patent No.: US 7,711,727 B2
(45) Date of Patent: *May 4, 2010

(54) UNIFORM SEARCH SYSTEM AND METHOD FOR SELECTIVELY SHARING DISTRIBUTED ACCESS-CONTROLLED DOCUMENTS

(75) Inventors: Rakesh Agrawal, San Jose, CA (US); Mayank Bawa, Palo Alto, CA (US); Roberto J. Bayardo, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 25 days.

This patent is subject to a terminal disclaimer.

(21) Appl. No.: 12/061,698

(22) Filed: Apr. 3, 2008

(65) Prior Publication Data
US 2008/0183703 A1 Jul. 31, 2008

Related U.S. Application Data

(63) Continuation of application No. 10/657,458, filed on Sep. 8, 2003, now Pat. No. 7,409,406.

(51) Int. Cl.
*G06F 17/30* (2006.01)
(52) U.S. Cl. .......... 707/711; 707/802
(58) Field of Classification Search .......... 707/3, 707/10, 102, 104.1, 100; 715/200
See application file for complete search history.

(56) References Cited

U.S. PATENT DOCUMENTS

| | | | |
|---|---|---|---|
| 5,845,278 A * | 12/1998 | Kirsch et al. | 707/3 |
| 6,018,733 A | 1/2000 | Kirsch et al. | |
| 6,389,412 B1 | 5/2002 | Light | |
| 6,879,976 B1 | 4/2005 | Brookler et al. | |
| 7,177,904 B1 | 2/2007 | Mathur et al. | |
| 7,472,093 B2 * | 12/2008 | Juels | 705/80 |
| 2002/0026345 A1 | 2/2002 | Juels | |
| 2003/0120680 A1 | 6/2003 | Agrawal et al. | |
| 2004/0093323 A1 | 5/2004 | Bluhm et al. | |
| 2004/0260680 A1 | 12/2004 | Best et al. | |
| 2004/0267700 A1 | 12/2004 | Dumais et al. | |
| 2005/0076104 A1 | 4/2005 | Liskov et al. | |

OTHER PUBLICATIONS

M. Reiter et al., "Crowds: Anonymity for Web Transactions," ACM Transactions on Information and System Security Nov. 1998, pp. 66-92, vol. 1, No. 1.

(Continued)

*Primary Examiner*—Cheryl Lewis
(74) *Attorney, Agent, or Firm*—Cantor Colburn LLP; Brian Lambert

(57) ABSTRACT

A privacy-preserving index system addresses the problem of providing a privacy-preserving search over distributed access-controlled content. Indexed documents can be readily reconstructed from inverted indexes used in the search. The privacy-preserving index system builds a centralized privacy-preserving index in conjunction with a distributed access-control enforcing search protocol. The privacy-preserving index utilizes a randomized algorithm for constructing a privacy-preserving index. The privacy-preserving index is strongly resilient to privacy breaches. The privacy-preserving index system allows content providers to maintain complete control in defining access groups and ensuring its compliance, and further allows system implementors to retain tunable knobs to balance privacy and efficiency concerns for their particular domains.

7 Claims, 8 Drawing Sheets

OTHER PUBLICATIONS

D. Xiaodong Song et al., "Practical Techniques for Searches on Encrypted Data" IEEE Symposium on Security and Privacy, 2000.

H. Hacigumus et al., "Executing SQL over Encrypted Data in the DataBase-Server-Provider Model" ACM Sigmod, Jun. 4-6, 2002, Madison, Wisconsin, USA.

R.J. Bayardo Jr., et al., "Web Hosting And Content Sharing Tool for the Masses," In Proc. of the Conf. on World Wide Web (WWW), 2002.

* cited by examiner

UNIFORM SEARCH SYSTEM AND METHOD FOR SELECTIVELY SHARING DISTRIBUTED ACCESS-CONTROLLED DOCUMENTS

CROSS-REFERENCE TO RELATED APPLICATIONS

This application is a continuation of U.S. patent application Ser. No. 10/657,458, filed Sep. 8, 2003, now U.S. Pat. No. 7,409,406, the disclosure of which is incorporated by reference herein in its entirety.

TRADEMARKS

IBM® is a registered trademark of International Business Machines Corporation, Armonk, N.Y. U.S.A. Other names used herein may be registered trademarks, trademarks or product names of International Business Machines Corporation or other companies.

BACKGROUND OF THE INVENTION

1. Field of the Invention

The present invention generally relates to performing searches on access-controlled data repositories located via networks such as the Internet or the World Wide Web. More specifically, this invention pertains to a digital-rights management tool for uniformly searching multiple distributed access-controlled data repositories 2. Description of Background While private and semi-private information on the Internet has grown rapidly in recent years, mechanisms for searching this information have failed to keep pace. A user faced with the problem of locating an access-controlled document would typically identify and individually search each relevant repository, assuming of course the user knows and remembers which repositories are relevant.

For example, company XYZ wishes to share some but not all of their internal research documents with company ABC. The documents that company XYZ wishes to share might refer to a collaborative project between the two companies. Company XYZ would like to be able to offer a search facility for that data, where company ABC can only search for documents to which they have access. However, company XYZ does not want company ABC to be able to determine what company XYZ is sharing with company Q. Currently, no method exists for uniformly searching data in this format between companies and individuals wishing to share data in an access-controlled format.

The lack of tools for searching access-controlled content on the network stems from the considerable difficulty in creating a search-engine that indexes the content while respecting the security and privacy requirements of the content providers. Contemporary search engines build inverted indexes that map a keyword to its precise locations in an indexed document.

Conventional inverted indexes represent an indexed document in its virtual entirety. The indexed document can thus be easily reconstructed from the index. The trust and security thus required of any host providing such an index over access-controlled content is enormous. Conferred with knowledge of every searchable document, the trust required of a search engine over access-controlled content grows rapidly with each participating provider. This enormous trust requirement, coupled with the potential for a complete breach of access control by way of malicious index disclosure, render such an approach impractical.

Conventional search solutions include centralized indexing, query broadcasting, distributed indexing, and centralized fuzzy indexing. The most common scheme for supporting efficient search over distributed content is centralized indexing, in which a centralized inverted index is built. The index maps each term to a set of documents that contain the term. The index is queried by the searcher to obtain a list of matching documents. This is the scheme of choice of web search engines and mediators Centralized indexing can be extended to support access-controlled search by propagating access policies along with content to the indexing host. The index host applies these policies for each searcher to filter search results appropriately. Since only the indexing host needs to be contacted to completely execute a search, searches are highly efficient. However, a centralized index may allow anyone who has access to the index structure to "provably expose" content providers. A provable exposure occurs when an adversary (i.e., hacker) can provide irrefutable evidence that provider p is sharing document d. In cases where the index host is completely trusted by all content providers, this violation of access control may be tolerable. Finding such a trusted host is immensely difficult. Further, compromise of the index host by hackers could lead to a complete and devastating privacy loss should the index be revealed publicly.

At the other end of the search efficiency spectrum lie query broadcasting, broadcast-based schemes that send the query to all participating content providers. Such schemes include a network of content providers, where providers locally evaluate each query and directly provide any matching documents to the searcher. The query broadcasting search protocol may be augmented to implement access control. In such a protocol, the query will be broadcast along with the identity and IP address of the query originator. Providers could securely deliver search results back to the authenticated searcher over an encrypted connection to avoid interception.

Since content shared by a provider p resides at the provider's database alone, providers are assured absolute privacy and the goal of content privacy is naturally preserved. However, while this adaptation to query broadcasting has excellent privacy characteristics, it suffers from poor scalability and severe performance penalties. Consequently, the protocols for query broadcasting adopt heuristics (e.g., time-to-live fields) that limit search horizons and compromise search completeness.

The performance limitations of query broadcasting have led to work on distributed indexing methods that support efficient search without the need for a single centralized index provider. For example, a peer-to-peer network may leverage "super-peers" (machines with above-average bandwidth and processing power) by having them host sub-indexes of content shared by several less capable machines.

Another system distributes a search index using a distributed hash table. In these systems, the distributed index is used to identify a set of documents (or machines that host the documents) matching the searcher's query. These machines are then contacted directly by the searcher to retrieve the matching documents.

Access control for distributed indexing systems can be supported by simply having the providers enforce their access policies before providing the documents. However, much as in the case of a centralized index, any node with access to a portion of the distributed index can provably expose any of the providers indexed by that portion.

Further, indexes are typically hosted by untrusted machines over whom the providers themselves have no control. An active adversary that does not host a portion of the index can search the distributed index to inflict privacy breaches. For example, the adversary can determine the precise list of providers sharing a document with a particular keyword by issuing a search on that keyword, breaching content privacy with provable exposure. Content privacy can also be breached by mounting phrase attacks. Such attacks take advantage of the observation that most documents have characteristic sets of words that are unique to them.

To identify a provider sharing some document, the adversary need only compose a query consisting of such terms for the document. The resulting list of sites are then known to share the document but with possible innocence. Possible Innocence occurs when the claim of an adversary about provider p sharing document d can be false with a non-trivial probability. By choosing an appropriate set of terms, the adversary can achieve a near provable exposure.

Some search applications do not maintain precise inverted index lists, but instead maintain structures that allow mapping of a query to a "fuzzy" set of providers that may contain matching documents; this approach is called centralized fuzzy indexing. A bloom filter index, which is a type of a fuzzy index, can be probed by a searcher to identify a list of all providers that contain documents matching the query. The list however is not necessarily precise, since bloom filters may produce false positives due to hash collisions. Given such a list, the searcher contacts each provider to accumulate results. These schemes can be extended to support access-controlled searches by having the providers enforce their access policies at the point a searcher requests matching documents.

Bloom filter indexes do offer limited privacy characteristics by virtue of potential false positives in the list of providers. Each provider in the list is thus possibly innocent of sharing a document matching the query. However, this privacy is spurious. An active adversary can perform a dictionary-based attack on the Bloom filter index to identify the term distribution of any indexed provider.

Dictionary-based attacks take advantage of the fact that sentences in natural language (e.g., English) use words from a restricted vocabulary that are easily compiled (e.g., in a Oxford/Webster dictionary). Thus, the adversary can compute a hash for each word in the vocabulary. A provider in the Bloom filter entry for such a hash is, with some probability, sharing a document with the corresponding word. In addition, the scheme remains prone to phrase attacks.

While these conventional search solutions might be adapted to support searches over access-controlled content, such adaptations fail to adequately address privacy and efficiency. Any search mechanism that relies on a conventional search index allows a provider to be "provably exposed" because of the precise information that the index itself conveys. Efficient privacy-preserving search therefore requires an index structure that prevents breaches of "content privacy" even in the event that the index is made public.

What is needed is a system and associated method that will allow searchers privileged access to access-controlled documents without exposing the contents of the document, the provider of the document, or even existence of the document to unauthorized searchers. The need for such a system and method has heretofore remained unsatisfied.

SUMMARY OF THE INVENTION

The present invention satisfies this need, and presents a system, a service, a computer program product, and an associated method (collectively referred to herein as "the system" or "the present system") for providing an efficient search mechanism that respects privacy concerns of the participating content providers. The present system allows companies and individuals to maintain control of their own data while providing a mechanism for searching that is efficient yet does not disclose what is being shared to unauthorized searchers in any amount of detail. Information that is revealed is "fuzzy" so that an unauthorized searcher cannot say with any certainty what information is being shared. The specific index structure of the present system does not allow a searcher or adversary to make any inferences about what is being shared by all of the various content providers.

Providers of documents to the index are assured at least "probable innocence" in response to active adversary attacks on the index. The present system builds a centralized index of content that works in conjunction with an access control enforcing search protocol across networked providers. The centralized index itself provides strong and quantifiable privacy guarantees that hold even if the entire index is made public. The degree of privacy provided by the centralized index may be tuned to fit the needs of the providers. Overhead incurred by the search protocol is proportional to the degree of privacy provided.

The present system may be applied in various sectors, where multiple organizations are actively competing as well as collaborating with constantly evolving alliances. Another application domain is file-sharing through personal web servers. For example, a person might wish to listen to a CD or a song at work but the CD is kept at some other place. This person could use the present system to search for copyrighted songs electronically available from other individuals or companies. This person shows evidence of ownership, an authentication, and can subsequently listen to the CD or song. The providers of the CD or song can keep track of the proofs supplied to allow audit of such exchanges. The present system provides the search mechanism that would then let the person search for whoever has that CD or song and give the person access to it.

The present system preserves the important appeal of private information sharing. Each provider has complete control over the information it shares: how much is shared, when it is shared, and with whom it is shared.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF THE INVENTION

The following definitions and explanations provide background information pertaining to the technical field of the present invention, and are intended to facilitate the understanding of the present invention without limiting its scope:

Absolute Privacy: An adversary cannot determine whether provider p is sharing document d.

Adversary: An entity that actively or passively, with or without deliberate intent, gathers unauthorized information about the content hosted by various providers. Adversaries may act individually or in collusion with other adversaries to breach privacy of the content providers.

Beyond Suspicion: An adversary cannot determine if provider p is more likely to be sharing document d than any other provider.

Bloom Filter: A bloom filter is a fuzzy set-indexing structure comprised of an array of N bits. A bloom filter is used herein to index a set of keywords K. Building the bloom filter requires a hash function H( ) that maps keywords to values in the range 1 . . . N. Given the set of keywords K and the hash function H, the present invention creates the bloom filter B[1 . . . N], as follows:

(1) set all bits B[1 . . . N] to 0, and
(2) for each keyword k in K, set B[H(k)] to 1.

A bloom filter allows the present invention to very efficiently answer queries of the following exemplary form: "Does the indexed set of keywords contain the keyword k?" This is accomplished by checking the value of B[H(k)]. If the bit is 0, then the set definitely *does not* contain keyword k. If the bit is 1, then the set might contain the keyword (the actual set itself will have to be consulted to verify for certain). A bloom filter is a very useful structure for quickly identifying and for removing providers that cannot answer a given query.

Peer: In networking, a functional unit that is on the same protocol layer as another.

Peer to Peer Network: A communications network in which any computer on the network can be a client and/or a server. Any computer can access files on any other computer in the network.

Possible Innocence: The claim of an adversary about provider p sharing document d can be false with a non-trivial probability (e.g., with probability in (0.5, 1)).

Probable Innocence: The claim of an adversary about provider p sharing document d is more likely to be false than true (e.g., with probability in (0, 0.5)).

Provable Exposure: An adversary can provide irrefutable evidence that provider p is sharing document d.

Figure 1:
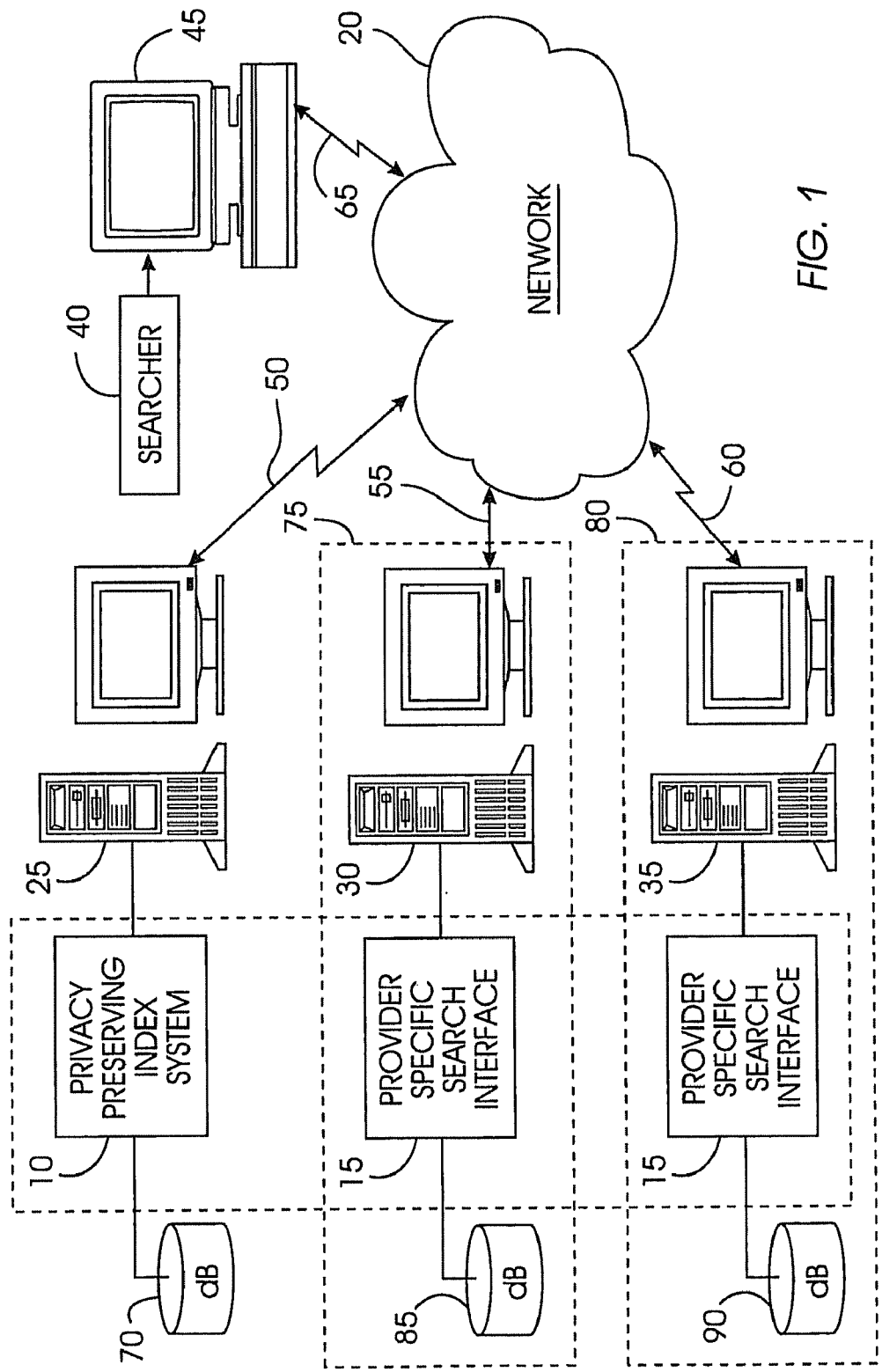
FIG. 1 is a schematic illustration of an exemplary operating environment in which a privacy-preserving index system of the present invention can be used.

FIG. 1 portrays an exemplary overall environment in which a uniform search system and associated method for selectively sharing distributed access-control documents according to the present invention may be used. System 100 comprises a privacy-preserving index system 10 and a provider-specific search interface 15. The privacy-preserving index system 10 includes a software programming code or computer program product that is typically embedded within, or installed on a privacy-preserving index server 25. The provider-specific search interface 15 includes a software programming code or computer program product that is typically embedded within, or installed on provider servers 30, 35.

Alternatively, the privacy-preserving index system 10 and the provider-specific search interface 15 may be saved on a suitable storage medium such as a diskette, a CD, a hard drive, or like devices. While the privacy-preserving index system 10 and the provider-specific search interface 15 will be described in connection with the WWW, they may be used with a stand-alone database of terms that may have been derived from the WWW and/or other sources.

The cloud-like communication network 20 may be comprised of communication lines and switches connecting servers such as the privacy-preserving index server 25 and the provider servers 30, 35, providing communication access to the WWW or Internet. Searchers, such as a searcher 40, query the privacy-preserving index server 25 for desired information through network 20. Searcher 40 may be an individual, a company, an application, etc. Computer 45 includes software that will allow the user to browse the Internet and interface securely with the privacy-preserving index server 25 and the provider servers 30, 35. The privacy-preserving index server 25, the provider servers 30, 35, and computer 45 are connected to network 20 via communications link 50, 55, 60, 65 such as a telephone, cable, or satellite link.

In the exemplary environment of FIG. 1, the privacy-preserving index system 10 is stored on dB 70. A content provider 75, 80 (also referenced herein as provider 75, 80) stores a set of documents on their respective databases, provider databases 85, 90. Providers 75, 80 control access to the documents on their respective provider databases 85, 90 through the provider-specific search interface 15.

Figure 2:
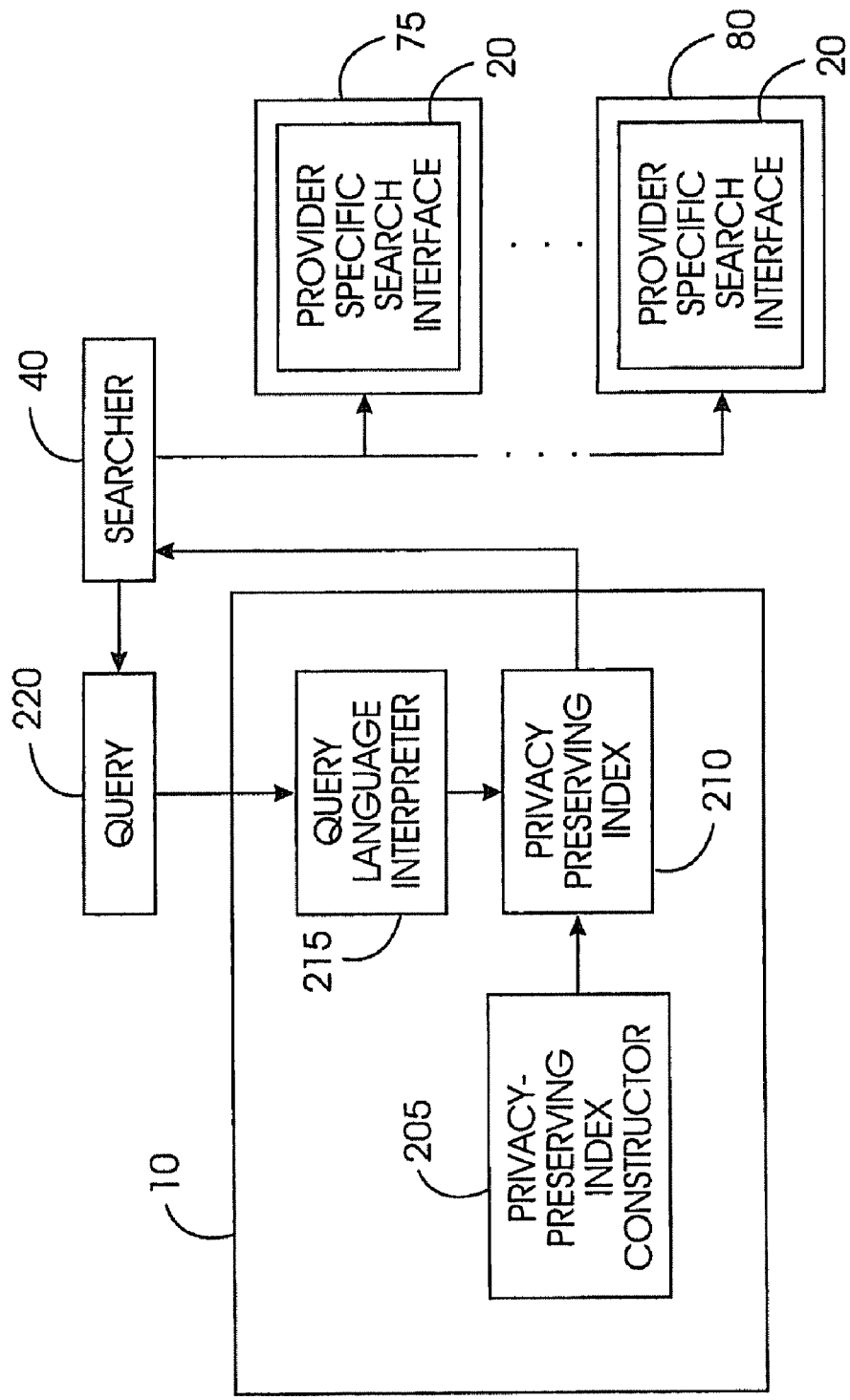
FIG. 2 is a block diagram of the high-level architecture of the privacy-preserving index system of FIG. 1.

The high-level architecture of the privacy-preserving index system 10 is illustrated by the block diagram of FIG. 2. The privacy-preserving index system 10 is comprised of a privacy-preserving index constructor 205, a privacy-preserving index 210, and a query language interpreter 215. When initially creating the privacy-preserving index 210, the privacy-preserving index constructor 205 maps query terms to a list of providers 75, 80.

Figure 3:
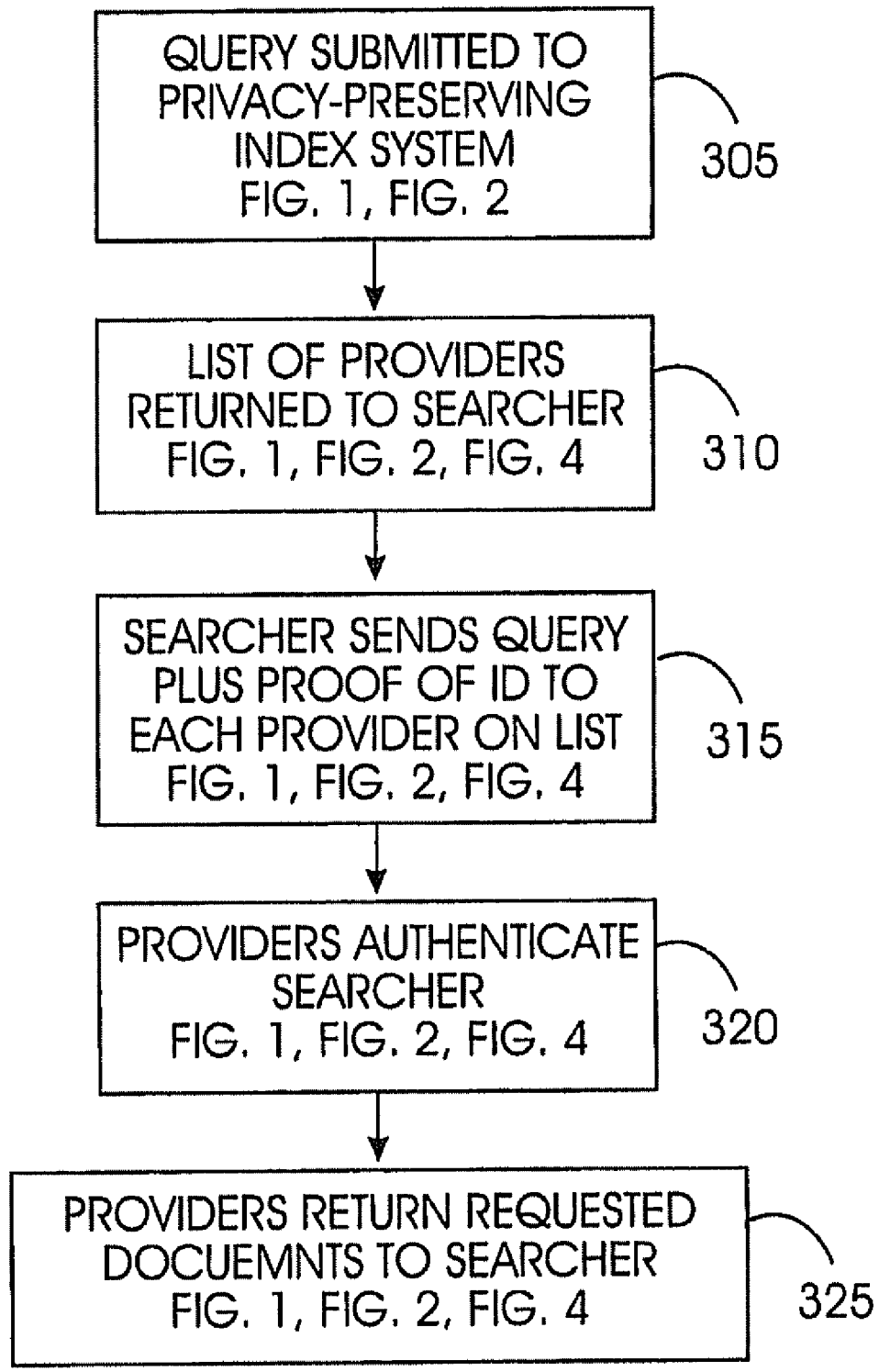
FIG. 3 is a process flow chart illustrating a method of operation of the privacy-preserving index system of FIGS. 1 and 2 in response to a query from a searcher.

A method 300 of operation of the privacy-preserving index system 10 is illustrated by the process flow chart of FIG. 3. At block 305, searcher 40 submits a query 220 to the privacy-preserving index system 10 in the form of one or more keywords. The privacy-preserving index 210 returns to searcher 40 a list of providers 75, 80 containing documents that might contain those keywords at block 310. As a feature of system 100, this list of providers 75, 80 may contain at least 50% false positives, i.e., half or fewer of the providers 75, 80 returned may actually have documents containing those keywords. Searcher 40 then searches those specified providers 75, 80 with the keywords annotated with the access privilege and authentication of searcher 40 (block 315). The providers 75, 80 authenticate searcher 40 at block 320 and respond with documents that match the keyword at block 325. Providers only return documents that both match the query, and that the user is permitted to access.

Figure 4:
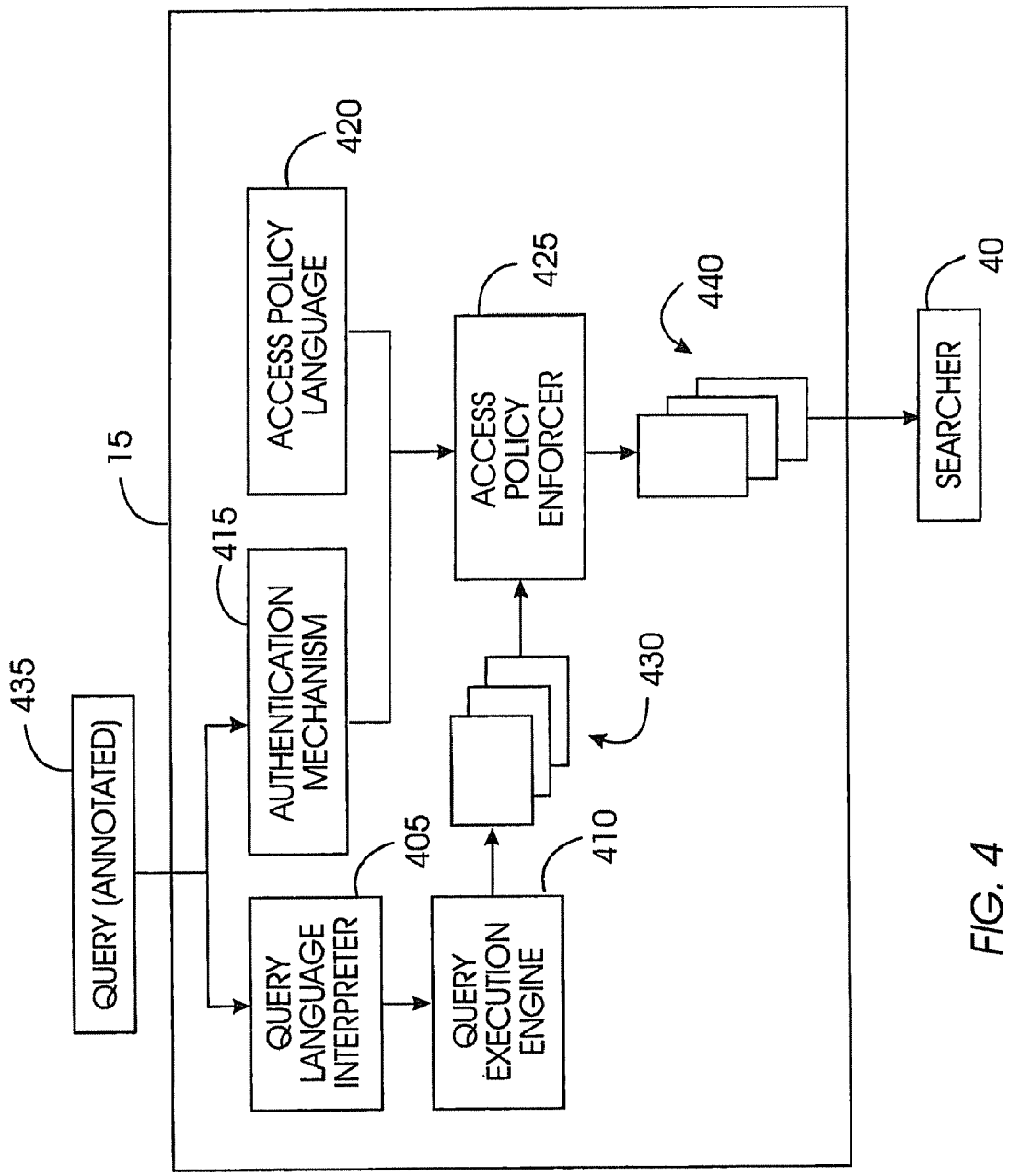
FIG. 4 is a block diagram of the high-level architecture of the provider-specific search interface of FIG. 1.

The high-level architecture of the provider-specific search interface 15 is illustrated by the block diagram of FIG. 4. The provider-specific search interface 15 comprises a query language interpreter 405, a query execution engine 410, an authentication mechanism 415, an access policy language 420, and an access policy enforcer 425. Input to the provider-specific search interface 15 is annotated query 435. The annotated query 435 comprises query 220 annotated with the identity of searcher 40. The query language interpreter 405 takes the annotated query 435 and converts it to machine language for use by the query execution engine 410. The query language interpreter 405 should support conjunctive keyword queries. Additional constructs (e.g., phrase search, negated terms, etc.) may be supported as well, so long as they only further constrain the result set. The authentication scheme used by the authentication mechanism 415 should allow searcher 40 to authenticate himself to each provider 75, 80 independently. One embodiment of system 100 does not require explicit registration with each provider 75, 80. Instead, searcher 40 achieves client authentication through third-party signed security certificates (e.g., SSL/TLS). Using the access policy language 420, providers 75, 80 are able to apply and enforce their access policies given the authenticated identity of searcher 40. This allows, for example, each provider 75, 80 to individually select the access policy language 420 that best fits their requirements.

A set of documents 430 is identified by the query execution engine 410 as matching the annotated query 435. The access policy enforcer 425 filters these documents based on the identity and specific access policy of searcher 40 as determined by the authentication mechanism 415 from the annotated query 435. A filtered set of documents 440 is returned to searcher 40.

The privacy-preserving index 210 is a mapping function built on the set of documents D being shared by the set of providers 75, 80. It accepts query 220 (q 220) and returns a subset of providers M that may contain matching documents. For the function to be considered privacy preserving, the set M for any query q 220 should satisfy one of the following conditions:

M is the null set only if there is no document in D that matches q 220.

M is a subset of providers 75, 80 comprising all providers that share a document matching q 220 ("true positives") and an equal or greater number of providers that do not share a matching document ("false positives").

M is the set of all providers 75, 80.

The privacy-preserving index 210 should behave like a conventional index; i.e., the privacy-preserving index 210 should return identical results for identical queries 220 unless the indexed content itself has changed. In addition, for any query q' whose results are a subset of another query q 220, the result set returned for q' should be a subset of that returned for q 220. These behavioral requirements prevent attacks that attempt privacy breaches by filtering out of false positives.

The privacy-preserving index 210 should be implemented with care: a naive implementation could easily yield more information than is allowed by the definition of the privacy-preserving index 210. For example, the host of the privacy-preserving index 210 might aggregate all shared content locally and preprocess it to materialize the privacy-preserving index 210 with true positives alone; the false positives as required by the definition being inserted into results at the time of query 220. In this case, the materialized version of the privacy-preserving index 210 itself does not correspond to the definitions of the privacy-preserving index 210. A public disclosure of the materialized version of the privacy-preserving index 210 would result in provable exposure of providers 75, 80. Instead, system 100 requires that a materialized version of the privacy-preserving index 210 should not yield any more information than that obtained from executing an exhaustive list of queries 220 against the privacy-preserving index 210.

The set M returned by the privacy-preserving index 210 for query q 220 never excludes any true positives for q 220. In other words, the result set for a query 220 may contain all providers 75, 80 that have at least one matching document. Searcher 40 contacts each provider 75, 80 to accumulate the results; the provider 75, 80 may release a document only if searcher 40 has sufficient access privilege. Consequently, searching with the privacy-preserving index 210 leads to correct output.

Searching distributed access-controlled content can be expressed in general terms as a set of content providers $P_1, P_2, \ldots, P_n$, and a searcher s who issues a query q. Each provider $P_1, P_2, \ldots, P_n$ is said to share a set of documents with access-control determined by the authenticated identity of searcher s and an access policy. The desired output is the set containing documents d such that:

d is shared by some provider $P_i$ for $1 < i < n$, d matches the query q, and d is accessible to s as dictated by access policy of $P_i$.

Just as important as ensuring correct output for a query q 220 is the requirement of preventing an adversary from learning what one or more providers may be sharing without obtaining proper access rights. Solutions to the issue of preserving privacy are described in terms of the susceptibility of the providers 75, 80 and the privacy-preserving index system 10 to privacy breaches by the types of adversaries described here.

A passive adversary is an eavesdropper who merely observes and records messages (queries, responses, indexes) sent in the system. Such an adversary may have either a global (ability to observe all messages in the system) or a local (ability to observe messages sent to/from a particular content provider) view of the system. An active adversary is an entity that acts with deliberate intent in accordance with the system protocol to gather information. In our model, such an adversary could inspect index structures, issue various queries, or even participate in the index construction process to facilitate such breaches. Adversaries may also collude with each other to breach privacy.

Adversaries may also be categorized according to roles they can assume. For example, most users (and hence adversaries) may be limited to performing the role of a searcher 40 since content providers 75, 80 are in practice likely to be a smaller and more controlled population. The information and operations accessible through each role (searcher 40, provider 75, 80, or the privacy-preserving index system 10) can be used to facilitate different types of breaches.

System 100 focuses on attaining the following privacy goal with respect to a document d made searchable by some content provider p:

An adversary A should not be allowed to deduce that p is sharing some document d containing keywords q unless A has been granted access to d by p.

The degree with which Content Privacy is attained against an adversary that does not have access to a document d being shared by provider p is characterized using the privacy spectrum introduced by Reiter and Rubin in their analysis of Crowds:

Provable Exposure: The adversary can provide irrefutable evidence that p is sharing d.

Possible Innocence: The claim of adversary about p sharing d can be false with a non-trivial probability (e.g., with probability in (0.5, 1)).

Probable Innocence: The claim of adversary about p sharing d is more likely to be false than true (e.g., with probability in (0, 0.5]).

Absolute Privacy: The adversary cannot determine if p is sharing d or not.

Beyond Suspicion: The adversary cannot determine if p is more likely to be sharing document d than any other provider.

In the above discussion, d can be replaced by any set of keywords q 220. In this case, the aim is to prevent the adversary from determining whether p is sharing a document that contains keywords in q 220.

While a conventional inverted list maps queries to lists of matching documents, the privacy-preserving index 210 maps queries to lists of matching providers 75, 80. Given the list of providers 75, 80 that may satisfy a query, it is then up to searcher 40 to directly query such providers 75, 80 and request matching documents. The providers 75, 80, on receiving a query and authenticating searcher 40, return a list of documents filtered according to the access rights of searcher 40.

By implementing search in this manner, system 100 moves the point of access control from the host of the privacy-preserving index 210 to the providers 75, 80. Providers 75, 80 can now manage and enforce access policies themselves without relying on any central host. While there is an efficiency penalty associated with the need to individually contact providers 75, 80, experimental results over publicly shared content indicate the performance of such an approach can be quite reasonable in practice, even when there are many (>1500) providers 75, 80.

A procedure for constructing the privacy-preserving index 210 should address not only the correctness of the resulting structure, but also the potential for privacy breaches during the construction process. Ensuring privacy in the presence of adversarial participants is non-trivial since the construction process of the privacy-preserving index 210 involves pooling together information about content shared by each provider 75, 80.

Figure 5:
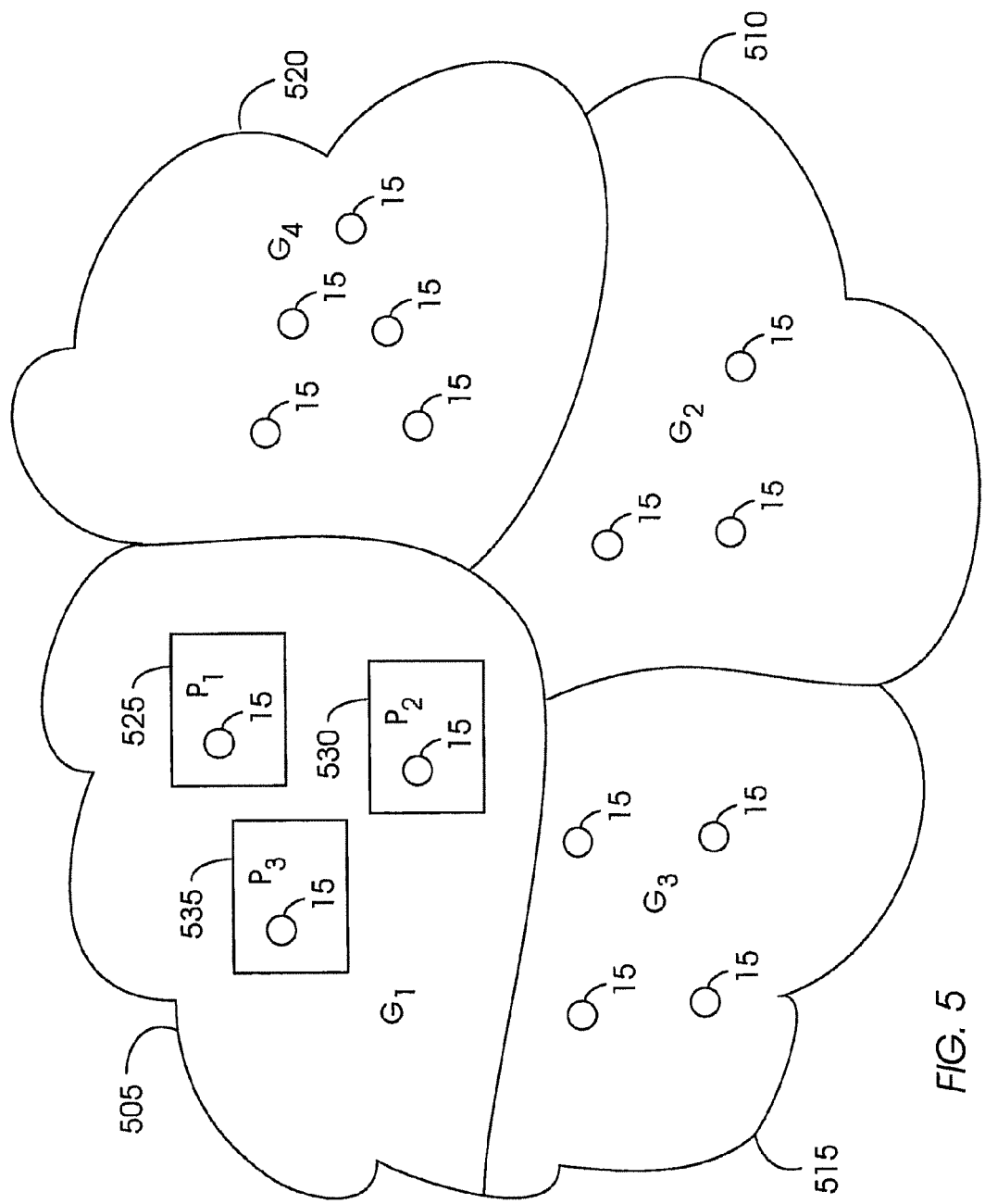
FIG. 5 is a diagram illustrating the grouping of content providers into privacy groups.

To construct the privacy-preserving index 210, providers are partitioned into peer groups or "privacy groups" of size c, as illustrated by the example of FIG. 5. In FIG. 5, a number of providers 75, 80 are divided into peer groups $G_1$ 505, $G_2$ 510, $G_3$ 515, and $G_4$ 520. Peer groups aren't required to be exactly the same size, but should be approximately the same size.

Each provider 75, 80 is in exactly one peer group and each comprises the provider-specific search interface 15. Group $G_1$ 505 is comprised of providers 75, 80 such as $P_1$ 525, $P_2$ 530, and $P_3$ 535. Within a group, providers $P_1$ 525, $P_2$ 530, and $P_3$ 535 are arranged in a ring. The providers $P_1$ 525, $P_2$ 530, and $P_3$ 535 execute a randomized algorithm for constructing the privacy-preserving index 210 that has only a small probability of error. By tuning a parameter, the error can be made small enough to be irrelevant in practice. The construction process ensures that providers are resilient to breaches beyond probable innocence.

Each provider 75, 80 flips bits in the "content vector" based on the keywords contained within its own data. However, the content vector is passed along the chain of members within its peer group. Thus, the randomized algorithm operates on this content vector which is passed between peers in a group. But the actual pattern of bits that are flipped by a peer is determined by that peer's own data. Providers 75, 80 decide which data they wish to be searchable and then place that data on their own provider server 30, 35 that is running system 100. Providers 75, 80 aren't giving their data to someone else, they are just making it available on the network 20 for searches.

There are two exceptions where a provider $P_1$ 525, $P_2$ 530, and $P_3$ 535 may suffer a breach larger than probable innocence from adversaries within its privacy group. Providers $P_1$ 525, $P_2$ 530, and $P_3$ 535 who immediately precede an active adversary may be assured of only possible innocence with respect to sharing documents with a particular term. Specifically, an adversary neighbor can determine whether its predecessor along the ring is sharing a specific term with at best 0.71 probability.

Another exception is for a provider 75, 80 when both its neighbors along the ring collude against it. For example, provider $P_1$ 525 and $P_2$ 530 may collude against $P_3$ 535. In such a case, the provider $P_3$ 535 may be provably exposed as sharing documents containing particular terms. Such a breach can be minimized by having provider $P_3$ 535 choose their neighbors $P_1$ 525 and $P_2$ 530 and on the ring based on previously established trust relationships.

Figure 6:
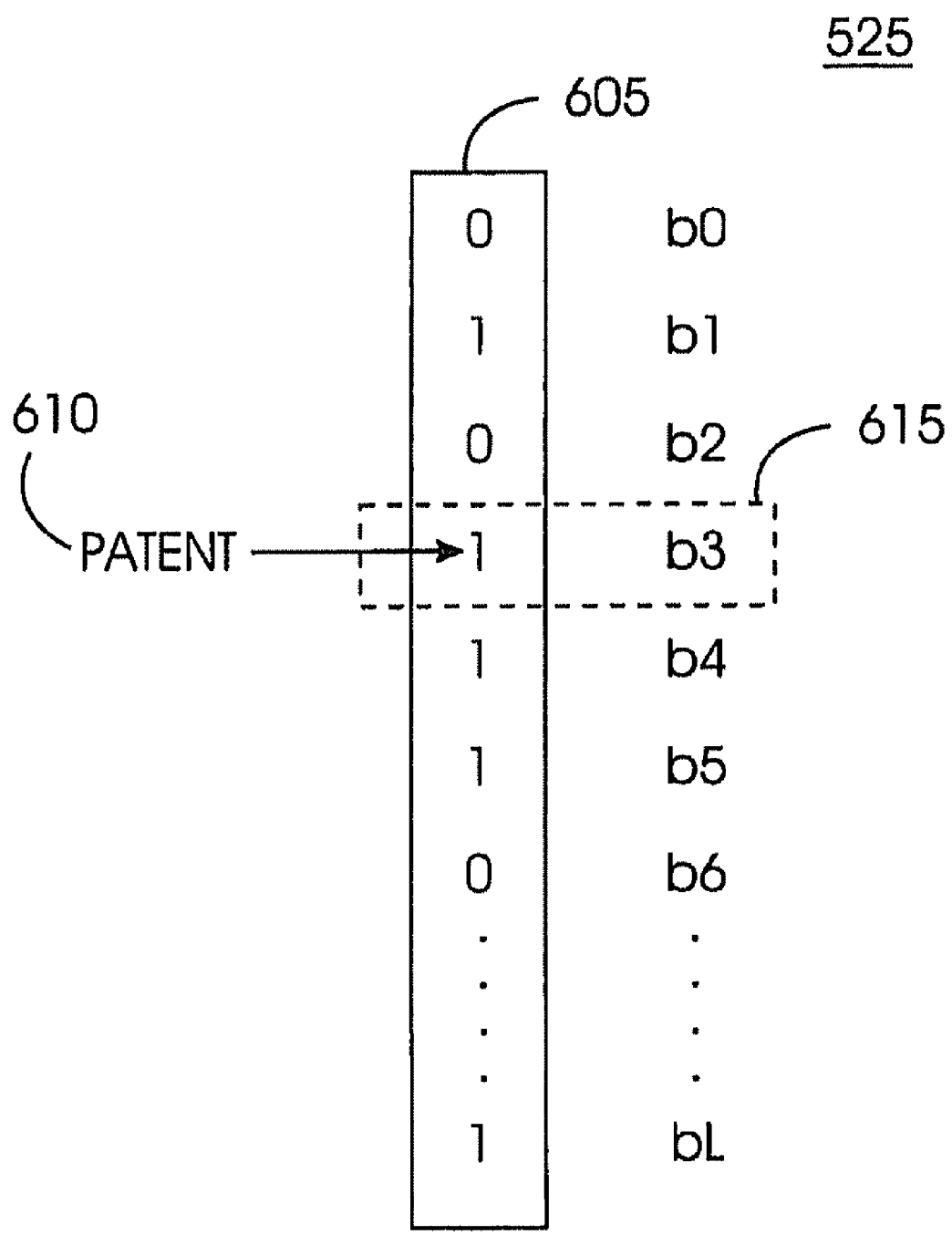
FIG. 6 is a diagram illustrating a bit vector created by a content provider.

The algorithm requires that each provider $P_1$ 525, $P_2$ 530, $P_3$ 535 summarize terms within its shared content through a bit vector V, called its content vector. An exemplary content vector V 605 is illustrated in FIG. 6 for provider $P_1$ 525. For example, a content vector might be a bloom filter of system-specified length L that is formed as follows. Each provider $P_1$ 525, $P_2$ 530, $P_3$ 535 initializes its V 605 by setting each bit to 0. Next, for each keyword term t appearing in its shared content, the provider $P_1$ 525, $P_2$ 530, $P_3$ 535 uses a system-specified hash function H with range 1, 2, . . . , L to set position H(t) in $V_s$ to 1. In exemplary content vector V 605, term 610, "patent", is hashed to bit 3 615 as represented by the "1" in the bit 3 615 space.

The content vector V 605 thus formed is a summary of shared content at provider $P_1$ 525. If the bit is 0, then it is guaranteed that $P_1$ 525 shares no documents containing term 610. If the bit is 1, then the term 610 might or might not occur at $P_1$ 525, since multiple terms might hash to the same value thus setting the same bit in V 605. The probability that such conflicts occur can be reduced by increasing the length L and/or using multiple hash functions.

Figure 7:
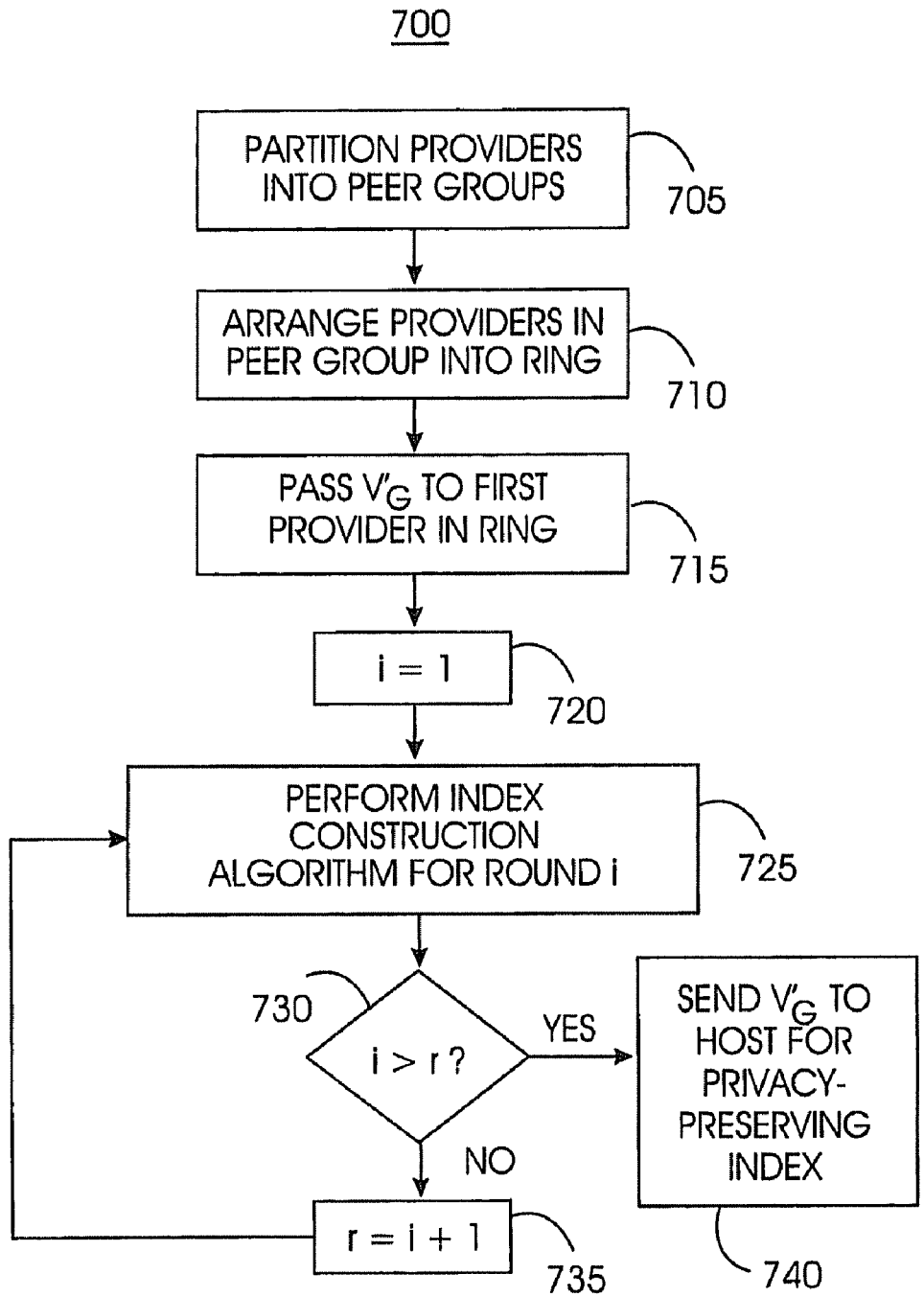
FIG. 7 is a process flow chart illustrating a method of operation of the privacy-preserving index system of FIGS. 1 and 2 in creating the privacy-preserving index.

The method 700 of constructing the privacy-preserving index 210 is illustrated by the process flow chart of FIG. 7. The construction process starts at block 705 by partitioning the space of providers 75, 80 into disjoint privacy groups of size c>2 each. The size of a privacy group is proportional to the degree of privacy enjoyed by each participant. The partitioning scheme may assign members to groups at random. For each privacy group, providers 75, 80 are arranged in a ring $p_1, p_2, \ldots, p_c$ at block 710. The terms successor and predecessor of a provider p are used in the usual way with respect to this ordering, with the additional requirement of $p_1$ being defined as the successor of $p_c$ (and $p_c$ the predecessor of $p_1$).

In general, define the group content vector of a group G as the vector $V_G$ resulting from performing a logical OR of the set of all content vectors from each provider P in group G. The next part of the construction is a randomized algorithm for generating the group content vector. The pseudo code for this randomized algorithm for generating the group content vector, V, at round r=i is summarized as:

1 INDEXCONSTRUCTION(r,Vs, $V_{G'}$) $P_{ex}:=\frac{1}{2} \cdot \sup^r P_{in}:=1-P_{ex}$ for (i:=1; i<L; i:=i+1) do if ($V_s[i]=1$ and $V_{G'}[i]=0$) then SET $V_{G'}[i]:=1$ WITH PROB. $P_{in}$ if ($V_s[i]=0$ and $V_{G'}[i]=1$) then SET $V_{G'}[i]:=0$ WITH PROB. $P_{in}$ SEND $V_{G'}$ TO Successor(s)

The construction involves performing r rounds in which a vector $V'_G$ is passed from provider to provider along the ring. At block 715, vector $V'_G$ is passed to the first provider in the ring, and i is set to 1 at block 720: Each provider, upon receiving the vector, performs the bit-flipping operations outlined in the randomized algorithm for generating the group content vector at block 725. If i.ltoreq.r at decision block 730 (where r is the total number of rounds the vector may be passed around the ring), vector V'.sub.G is passed on to the successor of the provider at block 735 and i is incremented by 1 at block 740. After r trips around the ring, the vector V'.sub.G is sent at decision block 730 to a designated index host such as the host for the privacy-preserving index system 10 (block 745).

In the randomized algorithm, the vector V'.sub.G is initialized by pi to a vector of length L with each bit independently set to 0 or 1 with probability ½. Each round is associated with probabilities P.sub.in and P.sub.ex such that P.sub.in+ P.sub.ex=1. The value of P.sub.ex is ½ initially. After each round, P.sub.ex is halved and P.sub.in is set appropriately.

This process of randomly flipping bits in V'.sub.G is designed such that the end result tends towards the group content vector with high probability. Randomization of the bit flips is used to prevent a malicious provider within the provider group from being able to determine with any certainty the value of bits in the content vector of other providers.

After the r bit-flipping rounds are complete, the vector V'.sub.G from each provider group is sent to a designated host, the host for the privacy preserving index system 10. This host receives these vectors from each privacy group along with a list of all providers in the privacy group. It then aggregates these vectors into a materialized index MI. The MI maps a bit position i to a list of providers that belong to privacy groups whose content vector has i set to 1. More formally, {p.vertline.p epsilon. G {circumflex over ( )} V'.sub.G[i]=1 for some privacy group G}

The process of using MI as the privacy-preserving index 210 that maps queries to providers is straightforward: M.sub.q is formed by taking the conjoined terms Q specified in q 220 and looking up each term's bit position 1 . . . L in MI using the system-specified lookup (hash) function H. The provider list is formed by taking the intersection of MI(i) for each such bit. More formally, M.sub.q=.andgate..sub.t.epsilon.Q-MI(H(t)). Consequently, MI serves as an implementation of the privacy-preserving index 210.

Figure 8:
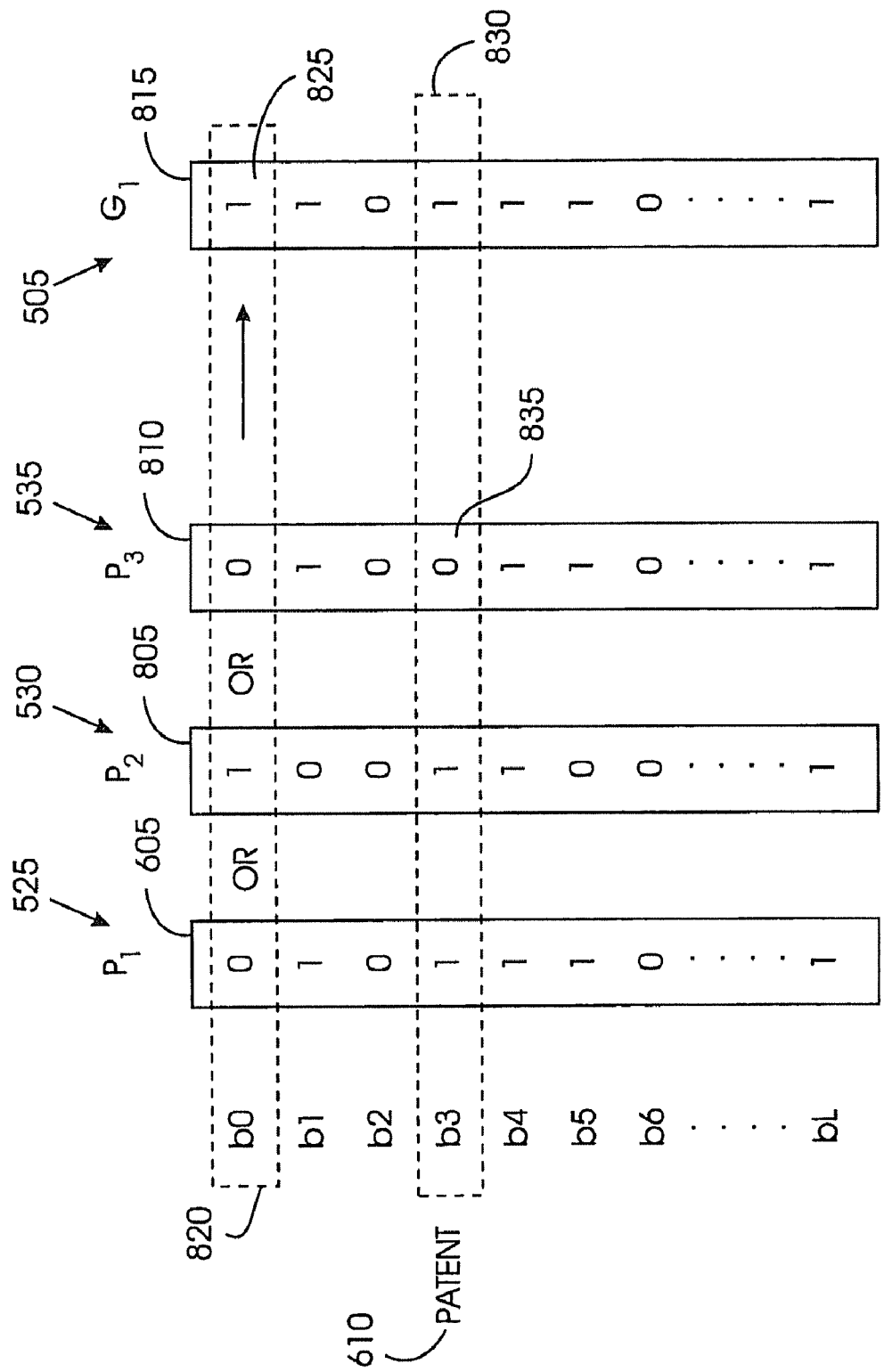
FIG. 8 is a diagram illustrating the bit vector created by the privacy-preserving index system of FIGS. 1 and 2 for a peer group of content providers.

The net effect of the method 700 on grouping the individual bloom filters for each providers P.sub.1 525, P.sub.2, 530, P.sub.3 535 within a group such as G.sub.1 505 is illustrated by the diagram of FIG. 8. In essence, method 700 applies an "or" function to the individual content vectors V.sub.1 605, V.sub.2 805, V.sub.3 810 to create the group vector V.sub.G1 815. For example, bit 820 is in the b0 location each of the content vectors V.sub.1 605, V.sub.2 805, V.sub.3 810. To obtain the b0 bit 825 in V.sub.G1 815, "0", "1", and "0" are "OR"ed together as shown in bit 820, with a result of "1". The same is true for all the bits in V.sub.G1 815. While in this example the "or" function is used, any other suitable logic function that produces the same result may also be used.

When searcher 40 searches the privacy-preserving index 210 for a keyword such as "patent" 610, the privacy-preserving index 210 finds that it has been hashed to b3 bit 830. The privacy-preserving index system 10 returns the list of providers P.sub.1 525, P.sub.2, 530, P.sub.3 535 in group G1 505 as having documents with the term "patent". Searcher 40 then knows to search the repositories at providers P.sub.1 525, P.sub.2, 530, P.sub.3 535. However, provider P.sub.3 535 does not have the keyword "patent" 610 in its content vector 810; i.e., the b3 bit 835 is 0. Searcher 40 discovers this only when searching the repository at P.sub.3 535 with proper identity authorization. Consequently, and adversary can not say with any certainty which of the providers P.sub.1 525, P.sub.2, 530, P.sub.3 535 contain the keyword "patent" 610.

It is to be understood that the specific embodiments of the invention that have been described are merely illustrative of certain applications of the principle of the present invention. Numerous modifications may be made to the uniform search system and method for selectively sharing distributed access-controlled documents invention described herein without departing from the spirit and scope of the present invention. Moreover, while the present invention is described for illustration purpose only in relation to the WWW, it should be clear that the invention is applicable as well to, for example, to data shared on local area networks, wide area networks, or any type of network where access-controlled data is to be shared.

What is claimed is:

1. A computer program product having a plurality of executable instruction codes stored on a computer readable medium, for selectively sharing a plurality of distributed access-controlled documents, comprising:

a plurality of content providers comprising a set of instruction codes for cooperating to create a privacy-preserving index structure;

a set of instruction codes for grouping the content providers into a plurality of privacy groups;

a set of instruction codes for passing a content vector from a first content provider in a privacy group of the plurality of privacy groups to a second content provider in the privacy group of the plurality of privacy groups;

a set of instruction codes for enabling the first and second content providers to operate on the content vector with a randomized algorithm;

a set of instruction codes for sending a plurality of content vectors to a designated host, each content vector of the plurality of content vectors corresponding to a respective privacy group of the plurality of privacy groups;

a set of instruction codes for aggregating the plurality of content vectors into a materialized index comprising the privacy-preserving index structure;

the privacy-preserving index structure comprising a set of instruction codes for mapping a plurality of keywords representing a content to be shared to the plurality of content providers; and a set of instruction codes for returning a list of the content providers having a subset of the content to be shared of the access-controlled documents that comprise a set of the keywords that satisfy a query.

2. The computer program product of claim 1, wherein the content providers comprise a set of instruction codes for receiving the query and for authenticating a searcher.

3. The computer program product of claim 2, further comprising the searcher submitting the query containing at least one of the keywords to the privacy-preserving index structure.

4. A processor-implemented system for selectively sharing a plurality of distributed access-controlled documents, comprising:

a plurality of content providers that cooperate to create a privacy-preserving index structure;

means for grouping the content providers into a plurality of privacy groups;

means for passing a content vector from a first content provider in a privacy group of the plurality of privacy groups to a second content provider in the privacy group of the plurality of privacy groups;

means for enabling the first and second content providers to operate on the content vector with a randomized algorithm;

means for sending a plurality of content vectors to a designated host, each content vector of the plurality of content vectors corresponding to a respective privacy group of the plurality of privacy groups;

means for aggregating the plurality of content vectors into a materialized index comprising the privacy-preserving index structure;

means for the privacy-preserving index structure mapping a plurality of keywords representing a content to be shared to the plurality of content providers; and means for returning a list of the content providers having a subset of the content to be shared of the access-controlled documents that comprise a set of the keywords that satisfy a query.

5. The system of claim 4, wherein the content providers comprise a provider specific search interface for receiving the query and for authenticating a searcher.

6. The system of claim 5, wherein the searcher submits the query containing at least one of the keywords to the privacy-preserving index structure.

7. The system of claim 6, wherein on receiving the query, at least some of the content providers return a list of filtered documents.

* * * * *